(12) United States Patent
Kashihara et al.

(10) Patent No.: US 7,263,264 B2
(45) Date of Patent: Aug. 28, 2007

(54) METHOD OF MANUFACTURING OPTICAL WAVEGUIDE

(75) Inventors: Kazuhisa Kashihara, Tokyo (JP); Masato Oku, Tokyo (JP); Akira Iino, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 113 days.

(21) Appl. No.: 10/960,013

(22) Filed: Oct. 8, 2004

(65) Prior Publication Data

US 2005/0123255 A1    Jun. 9, 2005

(30) Foreign Application Priority Data

Oct. 10, 2003    (JP)    ............... 2003-351574

(51) Int. Cl.
*G02B 6/02*    (2006.01)
*G02B 6/00*    (2006.01)

(52) U.S. Cl. ...................... 385/123; 385/142
(58) Field of Classification Search .............. None
See application file for complete search history.

(56) References Cited

U.S. PATENT DOCUMENTS

| | | | |
|---|---|---|---|
| 6,311,524 B1 * | 11/2001 | Brennan et al. | 65/378 |
| 6,334,018 B1 * | 12/2001 | Fokine | 385/124 |
| 6,622,527 B2 * | 9/2003 | Schotz et al. | 65/385 |
| 6,704,485 B1 * | 3/2004 | Campion et al. | 385/123 |
| 6,776,012 B2 * | 8/2004 | Chang et al. | 65/412 |
| 6,817,213 B2 | 11/2004 | Ishida | 65/414 |
| 7,079,736 B2 | 7/2006 | Takahashi et al. | 385/123 |
| 2002/0090183 A1 * | 7/2002 | Tuminaro | 385/102 |

FOREIGN PATENT DOCUMENTS

JP    2002-148450    5/2002

OTHER PUBLICATIONS

Y. Namihira, et al., "Hydrogen Problems in Optical Fibers", The Institute of Electronics, Information and Communication Engineers (IEICE), CS-84, 1984, pp. 27-34 (with partial English translation).
R. W. Lee, et al., "Diffusion of Hydrogen and Deuterium in Fused Quartz", The Journal of Chemical Physics, vol. 36, No. 4, Feb. 15, 1962, pp. 1062-1071.
Akira Iino, et al., "Mechanisms of Hydrogen-Induced Losses in Silica-Based Optical Fibers", Journal of Lightwave Technology, IEEE, vol. 8, No. 11, Nov. 1990, pp. 1675-1679.

* cited by examiner

*Primary Examiner*—Sung Pak
(74) *Attorney, Agent, or Firm*—Oblon, Spivak, McClelland, Maier & Neustadt, P.C.

(57) ABSTRACT

Two or more optical waveguides are placed in a treatment vessel. The optical waveguides in the treatment vessel are treated with a chemical substance containing at least one of deuterium, hydrogen, and a compound thereof. The treating includes causing molecules of the chemical substance to diffuse into the optical waveguides, causing the molecules of the chemical substance that have diffused into the optical waveguides to react with structural defects that exist in a portion, through which light propagates, of the optical waveguides, and removing from the optical waveguides molecules of the chemical substance that do not react with the structural defect.

9 Claims, 2 Drawing Sheets

METHOD OF MANUFACTURING OPTICAL WAVEGUIDE

BACKGROUND OF THE INVENTION

1) Field of the Invention

The present invention relates to a method of manufacturing an optical waveguide, such as an optical fiber, having lower density of structural defects.

2) Description of the Related Art

It is well known that light absorption occurs if any structural defect exists in a portion through which light propagates (hereinafter, "light propagating portion") of an optical waveguide. It is also known that if hydrogen molecules diffuse into the structural defect, the structural defect and the hydrogen molecules react with each other, which causes an increase in a transmission loss in the optical waveguide with time.

Japanese Patent Application Laid Open Publication No. 2002-148450 discloses a prior art for processing an optical fiber, which is an optical waveguide, to reduce the transmission loss. Particularly, the optical fiber is exposed to an atmosphere containing deuterium molecules ($D_2$) before the optical fiber is used.

The prior art includes a step of exposing the optical fiber to mixed gas containing deuterium molecules, and causing the deuterium molecules to react with the optical fiber while the deuterium molecules are made to contact the optical fiber. The method also includes a step of removing the deuterium molecules from the optical fiber in a neutral atmosphere, i.e., in the air or in a nitrogen atmosphere. Treatment of the optical fiber using this method before it is used allows reduction in the increase in the transmission loss that occurs in the optical fiber caused by hydrogen with time.

In the prior art, the optical fiber is exposed to the mixed gas containing deuterium molecules. More specifically, the optical fiber is exposed to the mixed gas containing 0.01% to 100% of deuterium molecules, preferably, 0.5% to 2% of deuterium molecules at 20° C. to 40° C. for 1 day to 2 weeks, preferably, 3 days to 10 days. Thereafter, the optical fiber is left standing in the air or the nitrogen atmosphere for 1 week to 3 weeks, and then the deuterium molecules are removed from the optical fiber.

In other words, in the prior art, even if the treatment is performed under favorable conditions, the treatment requires at least 10 days. Moreover, the optical fiber is treated one line by one line (one bobbin by one bobbin) in a treatment vessel where the treatment is performed. Therefore, it is quite difficult to reduce the treatment time per bobbin of optical fiber.

In the prior art, the optical fiber is exposed to the mixed gas containing deuterium molecules for 1 day to 2 weeks (hereinafter, "exposing step"), and then the optical fiber is left standing in the air or the nitrogen atmosphere for 1 week to 3 weeks and an excessive amount of the deuterium molecules is removed from the optical fiber (hereinafter, "removing step"). More specifically, at the exposing step, deuterium molecules are caused to diffuse into inside of the optical fiber (hereinafter, "diffusing step") while the optical fiber is exposed to the deuterium molecule-contained atmosphere, and the deuterium molecules are caused to react with the structural defects (hereinafter, "reacting step"). In other words, the exposing step, the diffusing step, and the reacting step are concurrently performed.

During the exposing step, the deuterium molecules continue diffusing into and penetrating the inside of the optical fiber through the periphery of the optical fiber, and even if the deuterium molecules finish reacting with the structural defects that exist in the light propagating portion, an excessive amount of deuterium molecules continues to be supplied to the light propagating portion. The excessive amount of deuterium molecules causes an increase in loss at a wavelength of about 1.7 micrometers. Broad absorption of the excessive deuterium molecules exerts influence over transmission characteristic at a wavelength of 1.5 micrometers that is a public-communication wavelength range. Therefore, the excessive deuterium molecules need to be removed, but in the prior art, the process extending over 1 week to 3 weeks is required only for the removal.

According to the experiments conducted by the inventors of the present application, it became clear that if the treatment is performed under an atmosphere that contains 100% of deuterium molecules, the exposing step can be performed generally in several hours, while the diffusing step and the reacting step require at least about 10 hours at a temperature ranging from 20° C. to 25° C. when a single mode optical fiber having an outer diameter of 125 micrometers is used. Of the two steps, the diffusing step is dominant, and the time required for reaction is extremely short.

SUMMARY OF THE INVENTION

It is an object of the present invention to solve at least the problems in the conventional technology.

A method of manufacturing an optical waveguide according to an aspect of the present invention includes placing a plurality of optical waveguides in a treatment vessel; and treating the optical waveguides in the treatment vessel with a chemical substance containing at least one of deuterium, hydrogen, and compound thereof. The treating includes causing molecules of the chemical substance to diffuse into the optical waveguides, causing the molecules of the chemical substance that have diffused into the optical waveguides to react with structural defects that exist in a portion, through which light propagates, of the optical waveguides, and removing, from the optical waveguides, molecules of the chemical substance that do not react with the structural defect.

An optical fiber cable according to another aspect of the present invention includes an optical fiber manufactured with the above method.

The other objects, features, and advantages of the present invention are specifically set forth in or will become apparent from the following detailed description of the invention when read in conjunction with the accompanying drawings.

DETAILED DESCRIPTION

Figure 1:
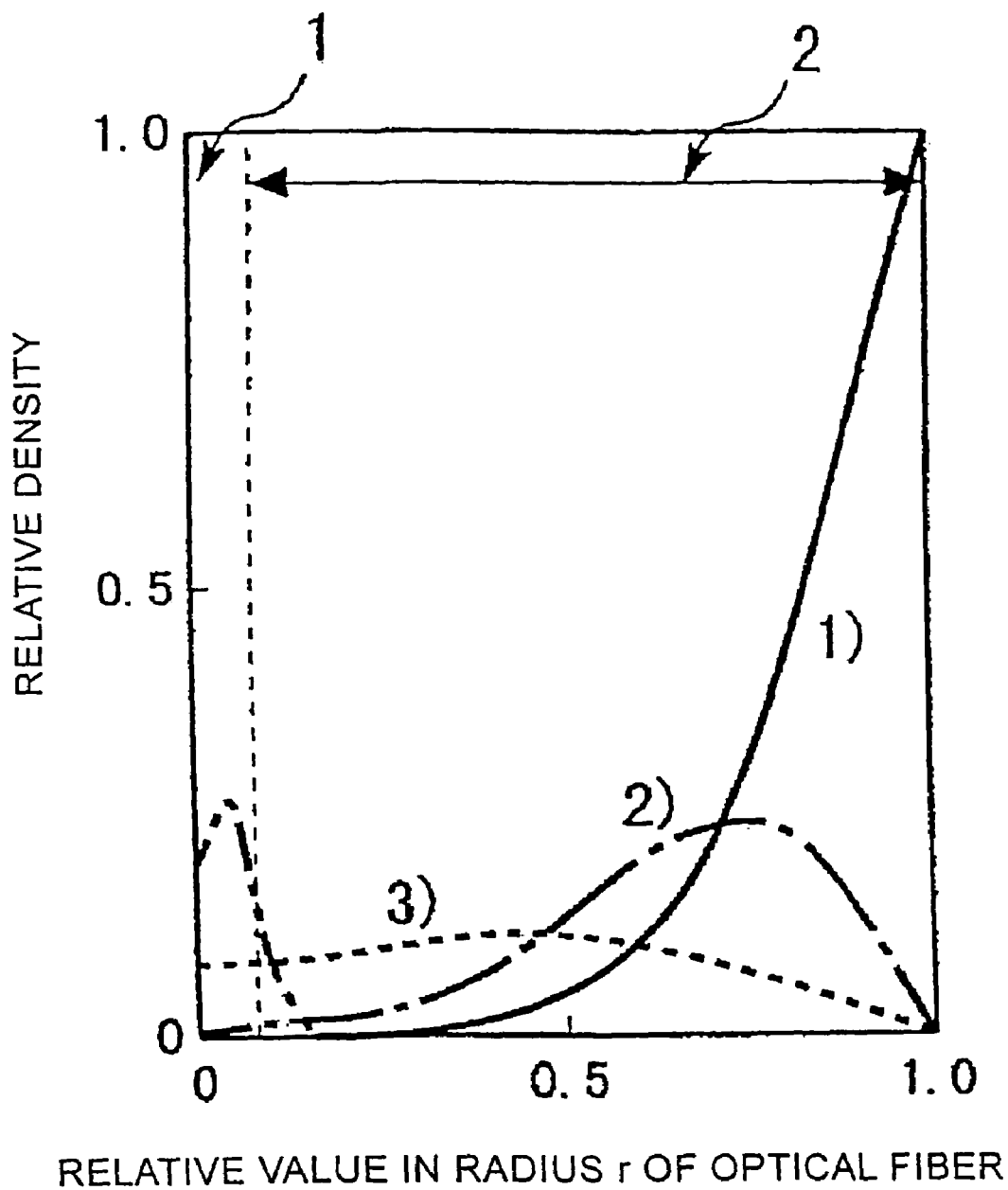
FIG. 1 is a schematic diagram for explaining why the present invention can cause a specified amount of deuterium molecules or hydrogen molecules to diffuse into a light propagating portion of an optical waveguide in a well-controlled manner.

Exemplary embodiments of a method of manufacturing an optical waveguide according to the present invention are explained in detail below with reference to the accompanying drawings.

At first, an explanation is given about how and why the structural defects, which are present in a light propagating portion of an optical fiber, react with deuterium molecules or hydrogen molecules, which diffuse into the light propagating portion.

This reaction takes place is accordance with the formulas (1) and (2) mentioned below.

It is believed that the structural defects can have various structures. These various structures will not be explained here. One of the most prominent theories is that the structure is related to silicon oxide (Si—O) and silicon (Si).

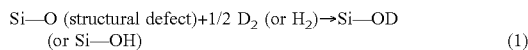

$$\text{Si—O (structural defect)} + 1/2\ D_2\ (\text{or}\ H_2) \rightarrow \text{Si—OD (or Si—OH)} \quad (1)$$

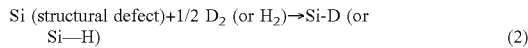

$$\text{Si (structural defect)} + 1/2\ D_2\ (\text{or}\ H_2) \rightarrow \text{Si-D (or Si—H)} \quad (2)$$

As clear from these formulae, in order that the structural defects related to silicon (Si) and oxygen (O) in glass react with deuterium molecules ($D_2$) or hydrogen molecules ($H_2$) so as to convert Si or O to more stable Si—OD (or Si—OH) or Si-D (or Si—H), the deuterium molecules or the hydrogen molecules with density equal to or more of the density of the structural defects need to diffuse into a portion where the structural defects exist.

An optical fiber was drawn with an electron spin resonance analyzer and the density of structural defects of the optical fiber was measured. The density of structural defects was about $10^{15}/cm^3$. Specifically, the optical fiber is an optical fiber with an outer diameter of 125 micrometers obtained by drawing a preform for a silicon-based single mode optical fiber of which core is doped with germanium (Ge) (a refractive index difference of the core with respect to a cladding is 0.35%). The outer periphery of the optical fiber obtained is coated with ultraviolet-curable urethane acrylate resin, and, as a result, the outer diameter of the optical fiber is 250 micrometers.

The behavior of the deuterium molecules or the hydrogen molecules penetrating inside the optical fiber can be theoretically expressed by a diffusion coefficient, a temperature, and a time. See, for example, the following references:

Namihira et al., The Institute of Electronics, Information and Communication Engineers (IEICE), 1984, CS-84; and R. W. Lee, R. C. Frank, and D. E. Swets "Diffusion of Hydrogen and Deuterium in Fused Quartz", The Journal of Chemical Physics, Vol. 36, No. 36, pp. 1062-1071, 1962.

By deciding a time required for exposing the optical fiber to deuterium molecules or hydrogen molecules and a temperature thereat, it is possible to calculate the density of the deuterium molecules or the hydrogen molecules in the light propagating portion using a surrounding temperature and atmosphere in which the optical fiber is left standing afterward. For the optical fiber, if the density of the deuterium molecules or the hydrogen molecules in the light propagating portion is several ppm, the density is higher than the density of structural defects. As a result, it is predicted that the structural defects can be changed to Si—OD (or Si—OH) and Si-D (or Si—H). An ordinary single mode optical fiber has fluctuations in the density of structural defects. However, it is found from the experiments that if the density of the deuterium molecules or the hydrogen molecules is 100 ppm at maximum in the core and the periphery thereof, the density thereof is adequate. At this time, an excessive amount of deuterium molecules or hydrogen molecules that is not contributed to reaction remains inside the optical fiber.

The deuterium molecules or the hydrogen molecules remaining in the optical fiber are gradually removing from the optical fiber to the outside if the optical fiber is left standing in the air or the nitrogen atmosphere.

However, if such a large amount of deuterium molecules that remain excessively in the optical fiber is made to diffuse into the light propagating portion, a transmission loss may increase at the wavelength of about 1.7 micrometers. The lower portion of a peak value due to the increase in the transmission loss at the wavelength of about 1.7 micrometers exerts influence up to a wavelength of 1.55 micrometers that is a bandwidth used for ordinary transmission. This results in also an increase in the transmission loss in the bandwidth with the wavelength of 1.55 micrometers. Therefore, it is desirable that the amount of deuterium molecules caused to diffuse into the light propagating portion be necessary minimum.

In the present invention, why the amount of deuterium molecules or hydrogen molecules penetrating the optical waveguide can be controlled to an amount more than the minimum required but not too excessive at the exposing step is explained in detail below with reference to FIG. 1. FIG. 1 is a schematic diagram for explaining a reason that the present invention can cause a specified amount of deuterium molecules or hydrogen molecules to diffuse into the light propagating portion of the optical waveguide, in a well-controlled manner. The schematic diagram represents the half of a vertical cross section of the optical fiber. In other words, the vertical cross section represents the right half from the center of the optical fiber.

Assume that a plurality of bobbins around each of which an optical fiber is wound are accommodated in the same treatment vessel and are exposed to an atmosphere containing 100% of deuterium molecules or of hydrogen molecules. In this case, how the deuterium molecules or the hydrogen molecules diffuse into the optical fiber after a predetermined time is as shown in FIG. 1.

Only the right side of the optical fiber is illustrated in FIG. 1, but the deuterium molecules or the hydrogen molecules diffuse into also from the left side thereof. In other words, both sides are almost symmetric to each other.

In FIG. 1, the y-axis represents relative density of the deuterium molecules or the hydrogen molecules, the x-axis represents relative values in the radius r of the optical fiber. The state of profile 1) of FIG. 1 indicates how the deuterium molecules or the hydrogen molecules diffuse into the optical fiber in the radius direction. Specifically, the deuterium molecules or the hydrogen molecules are in the state right after the optical fiber is taken out to the air after the optical fiber is exposed thereto for a predetermined time.

No other deuterium molecules or hydrogen molecules diffuse into the optical fiber that has been taken out to the air. A part of the deuterium molecules or the hydrogen molecules having diffused into the optical fiber further diffuses toward the light propagating portion of the optical fiber. On the other hand, some other deuterium molecules or hydrogen molecules remove through the surface of a cladding 2 into the air. Profile 2) represents the process of how they remove. Profile 3) represents a state in which the part of the deuterium molecules or the hydrogen molecules reaches up to the light propagating portion after some more time passes.

The light propagating portion of the optical fiber mentioned here includes a core 1 and a part of the cladding 2 which is provided outside the core 1, the part being adjacent to the core 1. More specifically, the light propagating portion indicates the core 1 and the part of the cladding 2, adjacent to the core 1, to which a part of the light that propagates through the core 1 leaks out.

The distributed state of the deuterium molecules or the hydrogen molecules changes to the state of the profile 3) of FIG. 1. The deuterium molecules or the hydrogen molecules having reached the light propagating portion react with the structural defect that exists in the light propagating portion, according to the reaction formula (1) and the reaction formula (2). The reaction allows Si—O or Si that is the structural defect to be changed to more stable Si—OD (or Si—OH) or Si-D (or Si—H).

In order to cause such reaction to be performed adequately, the amount of deuterium molecules or hydrogen molecules to diffuse into the optical fiber at the exposing step, i.e., an area of the profile 1) may be made a fixed amount. In other words, the area is surrounded by the curve of the profile 1) and the x-axis. The fixed amount mentioned here means an amount obtained by adding some margin to an amount required to react with the structural defect that exists in the light propagating portion and by further adding some amount corresponding to an amount that may remove to the outside of the optical fiber during a reacting-removing step. The value of the amount obtained may be determined through the experiments in the same manner as explained above.

If the fixed amount is set to a value too large for allowance, the amount of deuterium molecules or hydrogen molecules unreacted with the structural defect becomes too large. The excessive amount takes time to remove from the optical fiber to the outside, and causes the transmission loss at a wavelength of 1.7 micrometers to increase. Therefore, it is important to obtain a condition through the calculation and the experiment in advance so that the most adequate amount is made to diffuse into the optical fiber.

At the exposing step, the diffusion coefficient of deuterium molecules or hydrogen molecules diffused into the optical fiber is dependent on temperature. Therefore, if the temperature is higher, the deuterium molecules or the hydrogen molecules more quickly diffuse into the optical fiber.

However, if too high, it becomes slightly difficult to control so as to set the area of the profile 1) to the fixed amount. Consequently, an appropriate temperature of the atmosphere at the exposing step is an ordinary temperature, i.e., about 25° C.

Because the diffusion coefficient of the deuterium molecules or the hydrogen molecules is temperature-dependent, by increasing the ambient temperature higher and higher, penetration of the deuterium molecules or the hydrogen molecules to the light propagating portion including the core 1 is promoted. However, if the temperature is made too high, the transmission loss of the optical fiber increases for some other reasons.

For example, if deuterium molecules or hydrogen molecules exist in the core 1 or near the core 1 of the optical fiber that contains germanium (Ge) therein at an temperature of 60° C. or higher, reaction occurs between the deuterium molecules or the hydrogen molecules and a portion (Ge . . . O) where the bonding is weak. This causes a structural defect to occur in optical absorption related to Ge of which peak is in ultraviolet rays. The speed of the reaction increases more when the temperature is higher, that is, the reaction is largely dependent on temperature. See the following reference:

A. Iino, M. Kuwabara, and K. Kokura, Mechanisms of Hydrogen-induced Losses in Silica-Based Optical Fibers, Journal of Lightwave Technology, Vol. 8, No. 11, pp. 1675-1679, 1990.

If the temperature of the atmosphere where processing is performed is made to 60° C. or less, the increase in transmission loss due to the increase in temperature can be suppressed to a negligible level. In addition, thermal damage to a resin coat applied on the optical fiber can be suppressed.

Figure 2:
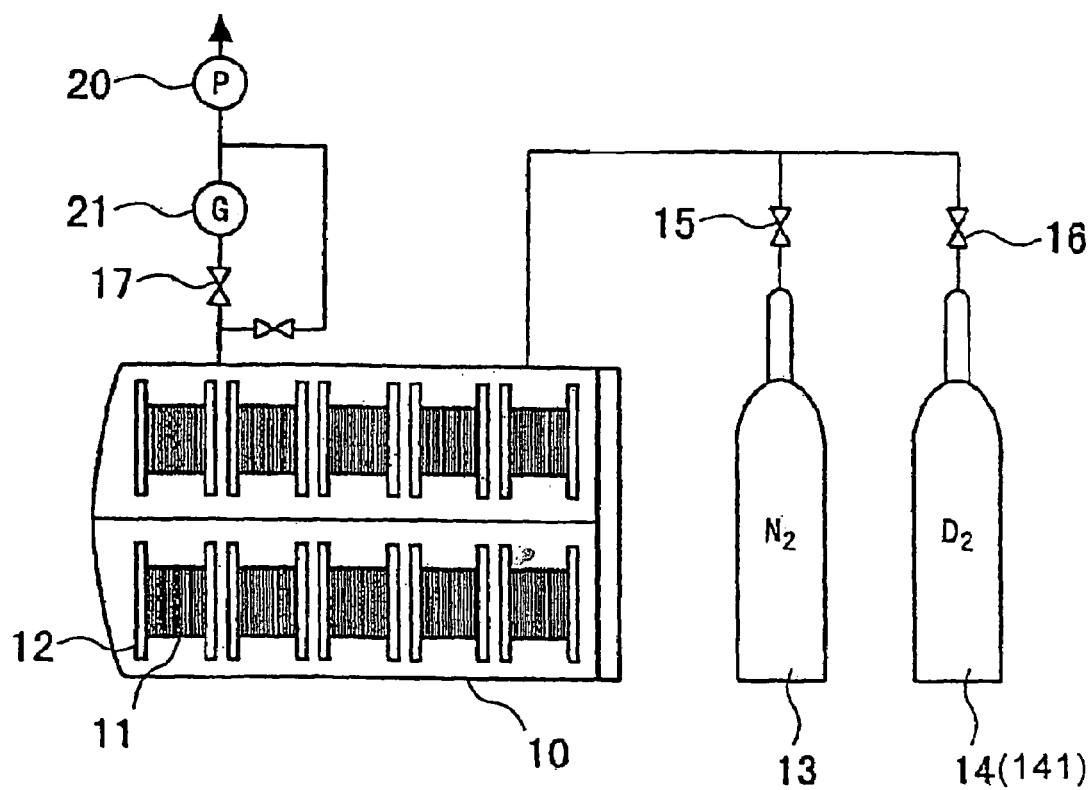
FIG. 2 is a schematic diagram of a method of manufacturing an optical waveguide according to an example of the present invention.

A concrete example of the method of manufacturing an optical waveguide according to the present invention is explained in detail below with reference to FIG. 2. FIG. 2 is a schematic diagram of the method of manufacturing an optical waveguide according to the present invention. More specifically, a plurality of optical waveguides, i.e., optical fibers are wound around 10 bobbins and are put in the same treatment vessel, and the bobbins with the optical fibers are treated in a batch manner.

Although deuterium molecules are used to explain the method below, hydrogen molecules, i.e., hydrogen gas can be used instead of deuterium molecules.

Twenty bobbins 12 each of which an optical fiber 11 was wound around about 2 kilometers were prepared, and 10 out of the 20 bobbins 12 were accommodated in a treatment vessel 10 with an content volume of about 120 liters as shown in FIG. 2. Thereafter, the treatment vessel 10 was sealed. At that time, a valve 15 and a valve 16 were closed. The valve 15 was fixed to a pipe extending from a nitrogen bomb 13 connected to the treatment vessel 10, and the valve 16 was fixed to a pipe extending from a deuterium bomb 14 connected thereto.

A valve 17 was opened in the state as explained above, and a pump 20 evacuated gas from the treatment vessel 10 to produce a vacuum (air pressure of $10^{-2}$ to $10^{-3}$) in the treatment vessel 10. It is noted that reference sign 21 represents a pressure gage.

When the vacuum was produced in the treatment vessel 10, the valve 16 was opened to lead deuterium gas from the deuterium bomb 14 to the treatment vessel 10. When the value of the pressure gage 21 reached a predetermined pressure, the valve 16 and the valve 17 were closed. In this example, about 130 liters of deuterium gas was lead into the treatment vessel 10.

The 10 bobbins 12 were exposed to an atmosphere of 100% of deuterium in the above manner for a predetermined exposure time, for example, 2 hours. After 2 hours passed, the valve 17 was opened to cause the pump 20 to operate, and the deuterium gas was evacuated from the treatment vessel 10 to the outside.

In this case, if a gas vessel (not shown) that stores the deuterium evacuated is provided beyond the pump 20 in advance and the deuterium gas evacuated is stored in the gas vessel, the deuterium gas can be recycled, which is preferable.

The temperature of the treatment vessel 10 where the bobbins 12 were exposed to deuterium molecules was maintained at 25° C. (25° C.±2° C.), which is room temperature.

The deuterium gas was evacuated from the treatment vessel 10, and the 10 bobbins 12 were transferred from the treatment vessel 10 to another place (chamber). Alternatively, the air was lead into the treatment vessel 10 and the circumference of the bobbins 12 was made to an air atmosphere. In this example, the atmosphere was made to the air atmosphere while the bobbins 12 were left standing in the treatment vessel 10. The atmosphere may also be made to the nitrogen atmosphere using the nitrogen bomb 13.

Thereafter, the treatment vessel 10 was sealed, and the temperature of the treatment vessel 10 was maintained at 35° C. (35° C.±3° C.) with a heater (not shown) provided around the treatment vessel 10. The temperature maintained allowed acceleration of reaction between the deuterium molecules having diffused into the optical fiber 11 at the exposing step and structural defects existing in the light propagating portion of the optical fiber. The temperature maintained also allowed acceleration of movement of deuterium molecules that remove from the optical fiber 11 to the outside.

As a result of maintaining this state for about ten hours to 20 hours, the deuterium molecules diffused into the optical fiber 11 and reached as far as the almost center of the core 1. When the deuterium molecules reach the light propagating portion by diffusion, the density of the deuterium molecules becomes higher than that of the structural defects. The deuterium molecules and the structural defects react with each other according to the reaction formula (1) and the reaction formula (2).

The reaction finishes in a short period of time even at about room temperature (20° C. to 25° C.). However, as explained in this example, if the bobbins 12 are left standing in the treatment vessel 10 at 35° C. for about 200 hours (about 200 h), the reaction according to the reaction formula (1) occurs. At the same time, the excessive amount of the deuterium molecules that does not contribute to the reaction diffuses into the outside of the optical fiber 11, and almost all the excessive amount goes out to the air. The optical fiber thus obtained is called optical fiber A1.

In the excessive amount of deuterium molecules, absorption occurs at a wavelength of about 1.7 micrometers. Therefore, it is impossible to measure a true transmission loss of the optical fiber 11 until unreacted deuterium molecules or hydrogen molecules completely remove from the light propagating portion.

Recently, transmission losses not only at a wavelength of 1.55 micrometers but also at a wavelength of 1.6 micrometers become a significant matter, and further the treatment against the transmission losses becomes more significant matter.

In the optical fiber A1, the temperature at the reacting-removing step was set to 35° C. However, in order to examine influence of the temperature at the reacting-removing step, the remaining 10 optical fibers were treated by setting the temperature at the reacting-removing step to 25° C. The optical fiber thus obtained is called optical fiber A2. A difference between the optical fiber A1 and the optical fiber A2 is only the treatment temperature at the reacting-removing step.

Transmission losses at a wavelength of 1.55 micrometers and at a wavelength of 1.625 micrometers after each of the optical fibers was left standing for 100 hours and for 200 hours, respectively, were measured. The results of measurement are given in table 1.

TABLE 1

| Optical fiber ( ) indicates an atmosphere | Exposing step T1 (100% D2) ° C. | Reacting-removing-step T2 (in the air) ° C. | Loss (dB/km, 1.55 μm/1.625 μm) | | |
|---|---|---|---|---|---|
| | | | At the initial stage | After 100 h in the air | After 200 h in the air |
| A1 (Present invention) | 25 ± 2 | 35 ± 3 | 0.18/0.20 | 0.18/0.20 | 0.18/0.20 |
| A2 (Present invention) | 25 ± 2 | 25 ± 2 | 0.18/0.20 | 0.19/0.21 | 0.18/0.20 |

For comparison, on the other hand, an optical fiber B was wound around a bobbin by two kilometers (a unit of bobbin) and was put in the treatment vessel 10 at room temperature (25° C.±2° C.). The optical fiber B was drawn from a preform for the optical fiber the same as that for the optical fiber A1 and optical fiber A2. The deuterium bomb 14 was replaced by a 2%-deuterium bomb 141 containing 2% of deuterium gas obtained by diluting the deuterium gas with argon.

When the treatment vessel 10 was evacuated by the pump 20 in the above manner, the valve 16 was opened and 2% of deuterium gas was lead from the 2%-deuterium bomb 141 to the treatment vessel 10. When the value of the pressure gage 21 became a predetermined pressure (air pressure of $10^{-2}$ to $10^{-3}$), the valve 16 and the valve 17 were closed. As a result, about 130 liters of the deuterium gas diluted was lead into the treatment vessel 10. One unit of bobbin 12 was exposed to an atmosphere of 2% of deuterium gas for 120 hours, and the deuterium gas was made to react with the structural defects in the optical fiber. The treatment vessel 10 was replaced fully by air, and after 100 hours and 200 hours, the transmission losses were measured at the wavelength of 1.55 micrometers, respectively. The results are given to table 2.

TABLE 2

| Optical fiber ( ) indicates an atmosphere | Exposing-reacting step T1 (2% D2) °C. | Removing step T2 (in the air) °C. | Loss (dB/km, 1.55 μm) | | |
|---|---|---|---|---|---|
| | | | At the initial stage | After 100 h in the air | After 200 h in the air |
| A1 (Comparative example) | 25 ± 2 | 25 ± 3 | 0.18 | 0.20 | 0.19 |

As shown in the table 1, in the optical fiber A2, the deuterium molecules are almost perfectly removed from the optical fiber, and about 200 hours in total are required to return to a loss value at an initial stage (hereinafter, "initial value"). However, as compared with the optical fiber B (comparative example) as shown in the table 2, it is understood that the treatment time even for the optical fiber A2 is largely reduced.

In other words, in the optical fiber A2, the treatment time is 202 hours (exposing step: 2 hours+reacting-removing step: 200 hours=202 hours), while the optical fiber B as the comparative example takes even 320 hours (exposing step, diffusing step, and reacting step: 120 hours+removing step: 200 hours=320 hours), but the loss value is not returned to the initial value.

It is presumed that this is because, in the optical fiber A2 according to the example, the reaction was made while the deuterium molecules were removed from the optical fiber. On the other hand, in the optical fiber B according to the comparative example, the reaction was made while the optical fiber was exposed to the deuterium atmosphere for a long time, which causes excessive deuterium molecules to diffuse into the optical fiber. Therefore, it is further presumed that it takes time to remove the excessive deuterium molecules therefrom.

In the example, the treatment vessel 10 was once evacuated and then the deuterium molecules were lead thereinto. Consequently, the deuterium molecules are allowed to contact the 10 bobbins, concurrently and uniformly, around each of which the optical fiber is wound. Therefore, according to the method of the present invention, the treatment time for each bobbin can also be largely reduced.

According to the optical fiber A1 (the example of the present invention) as shown in the table 1, a temperature T2 at the reacting-removing step was set to a higher temperature (35° C.±3° C.) than a temperature T1 (25° C.±2° C.) at the exposing step. Therefore, the time required to return to the initial value is reduced to the half as compared with that of the optical fiber A2. In the optical fiber A1, about 100 hours is adequate for the reacting-removing step.

The 20 bobbins in total including the optical fiber A1 (10 units) and the optical fiber A2 (10 units) were subjected to the treatment according to the present invention. The bobbins were then exposed to an atmosphere of hydrogen molecules (treatment with hydrogen: 100% of hydrogen, 25° C., and 2 hours), and then the bobbins were taken out to the air at 25° C. After 48 hours, the loss spectrum at the wavelength of the optical fiber was measured.

There was another optical fiber that had been drawn from the preform for the optical fiber the same as the preform for the optical fibers A1 and A2, and that was not subjected to the deuterium treatment according to the present invention. In this case, it is recognized that performance of the treatment with hydrogen caused the absorption peak due to an Si—OH group to increase at 1.39 micrometers and the absorption peak due to an Si—H group to increase at 1.52 to 1.53 micrometers.

However, in the optical fibers A1 and A2 subjected to the deuterium treatment according to the present invention, the absorption peak due to the Si—H group was not found at all. The increase in the absorption peak at 1.39 micrometers due to the Si—OH group was not found either. This indicates that almost all the structural defects contributing to reaction with hydrogen molecules have already reacted with deuterium molecules. Furthermore, this indicates that the method according to the present invention allows the treatment for all the optical fibers even if they have fluctuations in the density of structural defects in each light propagating portion.

In the treatment with deuterium, the deuterium reacts with the structural defects existing in the optical fiber to generate Si—OD and Si-D. Because absorption due to these groups appears at a wavelength longer than 1.8 micrometers, the absorption hardly affects the loss value at a wavelength of about 1.55 micrometers. Therefore, it is preferable to perform treatment with deuterium on the optical fiber for communications through which light propagates at a wavelength of about 1.3 micrometers or about 1.55 micrometers.

In the example, although the optical fiber is treated with deuterium molecules, the treatment with hydrogen molecules is possible in the same manner as explained above. The diffusion coefficient of hydrogen molecules is slightly larger than that of deuterium molecules, but it is not necessary to largely change treatment conditions.

It is preferable that hydrogen molecules be used to treat an optical fiber or a bundle of optical fibers through which ultraviolet rays or visible rays propagate. It is found that the treatment with hydrogen molecules allows elimination of such structural defects that optical absorption occurs at a wavelength of ultraviolet rays to a visible wavelength. In other words, the loss can be improved over the ultraviolet rays to the visible portion.

In the treatment with hydrogen molecules, Si—OH and Si—H are generated, but absorption due to these two appears at a wavelength of about 1.38 micrometers to about 1.53 micrometers. Therefore, almost no influence is exerted over the ultraviolet rays to the visible portion. Furthermore, hydrogen is inexpensive than deuterium.

In the example, in order to quickly remove an excessive amount of deuterium molecules that did not contribute to reaction in the optical fiber, the temperature T2 for the treatment at the reacting-removing step was made higher than the temperature T1 for the treatment at the exposing step. However, it is not preferable to make the temperature T2 too high. This is because if T2 is made higher than 60° C., the excessive amount of deuterium molecules or hydrogen molecules, which does not contribute to reaction, reacts with a glass structure of the optical fiber, mainly a weak portion in bonding that occurs caused by doping germanium therein. The reaction causes occurrence of structural defects such as absorption in ultraviolet rays. The amount of this absorption is extremely large, which exerts influence over the visible portion to the wavelength of about 1.55 micrometers. Furthermore, an urethane acrylate resin coat applied on the optical fiber may be degraded.

In the example, although the treatment vessel 10 is first evacuated and then deuterium gas is lead thereinto, the step of evacuation may be omitted.

In this case, the air in the treatment vessel 10 is gradually replaced by deuterium molecules. This method also allows deuterium molecules to contact 10 optical fibers almost concurrently. However, since the density of deuterium gas around the optical fiber increases little by little over the time, the treatment time is required longer.

In the example, although 100% of deuterium gas is allowed to contact the optical fiber, the deuterium gas may be diluted with some other gas such as nitrogen. Mixed gas containing deuterium molecules or hydrogen molecules may be used. It is important that the density of deuterium molecules or hydrogen molecules in the light propagating portion is equal to or larger than the density of structural defects.

In the example, although an air atmosphere is prepared to remove deuterium molecules from the optical fiber, an atmosphere of nitrogen may be used. Likewise, inactive gas such as argon practically containing no hydrogen gas may be used, but the air (atmosphere) is preferable in terms of costs. Moreover, the evacuation of the treatment vessel may be used together with the other means. For removal of deuterium molecules, it is important to reduce the density of deuterium around the optical fiber as low as possible.

If the treatment vessel 10 is made larger to accommodate a large number of optical-fiber bobbins therein and the temperature thereof is made high up to 60° C., a heater with a large capacitor and gas agitation in the treatment vessel 10 are required, which causes the treatment cost to increase. Therefore, it is preferable to use room temperature for the treatment vessel 10, put the bobbins into a chamber whose temperature is made higher than room temperature, and let excessive deuterium molecules or excessive hydrogen molecules remove from the optical fiber to the air.

As explained above, the most important control point of the method according to the present invention is the exposing step. Therefore, at the following reacting-removing step, all the optical waveguides are not necessarily put in the same treatment vessel 10 or in the same chamber if environmental conditions (temperature and atmosphere) are almost the same as these as explained above.

The diffusion coefficient of deuterium molecules or hydrogen molecules is different by about one digit from another diffusion coefficient thereof if there is a temperature difference of 10° C. Therefore, if a difference in temperature between the temperatures T1 and T2 is 5° C. at the median of their fluctuations, it is effective in reduction of the treatment time.

In the example, although the optical fiber is used in the form of being wound around the bobbin, any form such as a bundle of optical fibers may be used. The reason is that deuterium molecules and hydrogen molecules easily diffuse into an organic substance or glass because they have a molecule diameter smaller than that of any other gas.

In the example, although the single mode optical fiber with the core 1 doped with germanium is used, the optical fiber is not limited thereto. The method according to the present invention can be used for any optical fiber with the core 1 that is made of pure silicon glass, optical fiber with the core 1 doped with a small amount of fluorine (F), and optical fiber with the core 1 doped with germanium, phosphorus (P), and fluorine.

Furthermore, the method according to the present invention can be easily used for a plane type optical waveguide in which occurrence of structural defects may be predicted.

According to the method of manufacturing the optical waveguide of the present invention, the treatment for preventing the increase in the transmission loss by hydrogen with time can be performed in a batch manner on the optical waveguides such as optical fibers in a shorter treatment time.

By manufacturing an optical fiber cable using the optical waveguides, i.e., the optical fibers that are treated in a batch manner in a short period of time, it is possible to provide the optical fiber cable with stabilized transmission loss over the long period of time at low costs.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of manufacturing an optical waveguide, the method comprising:
exposing the optical waveguide to molecules of a chemical substance including at least one of deuterium, hydrogen, and a compound thereof;
removing the optical waveguide from the chemical substance before the molecules of the chemical substance enter a light propagating portion of the optical waveguide and exposing the optical waveguide to air or nitrogen; and
reacting the molecules of the chemical substance that have diffused into the light propagating portion of the optical waveguide with structural defects that exist in the light propagating portion of the optical waveguide while removing the molecules of the chemical substance from the optical waveguide.

2. The method according to claim 1, wherein the most adequate amount of molecules of deuterium or hydrogen is that the molecules of deuterium or hydrogen reaches the core regions of the optical fibers, and the difference of transmission losses between the transmission losses at a wavelength of 1.55 micrometers and at a wavelength of 1.625 micrometers after each of the optical fibers was left standing for 100 hours and before treatment is less than 0.01 db/km.

3. The method according to claim 1, further comprising:
placing a plurality of optical waveguides in a treatment vessel.

4. The method according to claim 1, further comprising:
evacuating a treatment vessel, in which the optical waveguide is placed, before performing the exposing step.

5. The method according to claim 1, wherein the exposing includes exposing the optical waveguides to either one of 100% of deuterium molecules and 100% of hydrogen molecules.

6. The method according to claim 1, wherein if T1 is a temperature in an atmosphere at the exposing, and T2 is a temperature in an atmosphere at the reacting, then T1 and T2 are controlled so that T1<T2.

7. The method according to claim 6, wherein the temperature T2 is equal to or higher than 20° C. and equal to or lower than 60° C.

8. The method according to claim 1, wherein the optical waveguide is an optical fiber.

9. An optical fiber cable comprising an optical fiber according to claim 8.

* * * * *